United States Patent
Mikhailov et al.

(10) Patent No.: US 10,917,373 B2
(45) Date of Patent: Feb. 9, 2021

(54) METHOD AND SYSTEM FOR MANAGING ELECTRONIC MESSAGE THREADS

(71) Applicant: RingCentral, Inc., Belmont, CA (US)

(72) Inventors: Ilya Vladimirovich Mikhailov, Saint Petersburg (RU); Vlad Vendrow, Redwood City, CA (US); Christopher van Rensburg, Foster City, CA (US); Aleksei Petrov, Redwood City, CA (US)

(73) Assignee: RingCentral, Inc., Belmont, CA (US)

(*) Notice: Subject to any disclaimer, the term of this patent is extended or adjusted under 35 U.S.C. 154(b) by 148 days.

(21) Appl. No.: 15/343,735

(22) Filed: Nov. 4, 2016

(65) Prior Publication Data
US 2018/0048604 A1    Feb. 15, 2018

Related U.S. Application Data

(63) Continuation of application No. PCT/RU2016/000533, filed on Aug. 10, 2016.

(51) Int. Cl.
| | | |
|---|---|---|
| *G06F 15/16* | (2006.01) | |
| *H04L 12/58* | (2006.01) | |
| *H04W 4/23* | (2018.01) | |
| *H04L 29/08* | (2006.01) | |

(52) U.S. Cl.
CPC .......... *H04L 51/16* (2013.01); *H04L 67/306* (2013.01); *H04W 4/23* (2018.02)

(58) Field of Classification Search
CPC ......... H04L 51/16; H04L 51/32; H04L 51/26; H04L 67/306; G06Q 10/107; G06F 17/30598

USPC ......................... 709/206, 207, 204
See application file for complete search history.

(56) References Cited

U.S. PATENT DOCUMENTS

| 7,475,110 B2 | 1/2009 | Kirkland et al. |
|---|---|---|
| 8,977,607 B1 | 3/2015 | Lu et al. |
| 2005/0108345 A1* | 5/2005 | Suzuki .................... H04L 51/00 709/206 |
| 2008/0301250 A1 | 12/2008 | Hardy et al. |

(Continued)

FOREIGN PATENT DOCUMENTS

WO    WO 03/075196 A1    9/2003

OTHER PUBLICATIONS

International Search Report for International Application No. PCT/RU 2016/000533, dated Apr. 6, 2017, 2 pages.

(Continued)

*Primary Examiner* — Kaylee J Huang
(74) *Attorney, Agent, or Firm* — Finnegan, Henderson, Farabow, Garrett & Dunner, LLP

(57) ABSTRACT

An electronic message thread management system is disclosed. The electronic message thread management system may include a memory and at least one processor. The at least one processor may be configured to analyze an electronic message thread to differentiate among a plurality of subjects reflected in the electronic message thread, using at least a timestamp associated with each message included in the electronic message thread; designate each message in the electronic message thread according to one or more of the different subjects; and provide messages in the electronic message thread based on the designation of the messages.

20 Claims, 9 Drawing Sheets

(56) References Cited

U.S. PATENT DOCUMENTS

| | | | |
|---|---|---|---|
| 2013/0147849 A1* | 6/2013 | Kwak | G09G 5/14 345/666 |
| 2014/0358842 A1* | 12/2014 | Flinn | G06N 5/048 706/52 |
| 2014/0379818 A1* | 12/2014 | Cudak | H04L 51/16 709/206 |
| 2015/0088784 A1 | 3/2015 | Dhara et al. | |
| 2015/0188869 A1* | 7/2015 | Gilad | H04L 51/22 715/752 |
| 2016/0080303 A1* | 3/2016 | Deolalikar | G06Q 10/107 709/206 |
| 2016/0119265 A1* | 4/2016 | Akavaram | G06Q 10/107 709/206 |
| 2016/0147714 A1* | 5/2016 | Shoji | G06F 17/212 715/247 |
| 2016/0156578 A1* | 6/2016 | Allen | G06F 17/30867 709/206 |
| 2016/0182661 A1* | 6/2016 | Brezina | H04M 15/00 709/206 |
| 2017/0373999 A1* | 12/2017 | Abou Mahmoud | H04L 51/16 |

OTHER PUBLICATIONS

Written Opinion of the International Searching Authority for Application No. PCT/RU 2016/000533, dated Apr. 6, 2017, 4 pages.

\* cited by examiner

METHOD AND SYSTEM FOR MANAGING ELECTRONIC MESSAGE THREADS

TECHNICAL FIELD

The present disclosure relates to the field of communication systems and, more particularly, methods and systems for managing electronic message threads.

BACKGROUND

In a group communication environment, such as a chat application, a social network application, a collaboration platform, or the like, participants of a group communication often discuss a variety of different subjects in a single electronic message thread. To find messages relating to a specific subject, a user may need to manually review all messages in a thread one by one. It becomes difficult for a participant to identify messages relating to a particular subject when the number of messages in an electronic message thread is large and several different subjects are discussed in the same electronic message thread.

One way to separate different subjects in an electronic message thread is to create a new electronic message thread each time a new subject is initiated. However, this often requires an active operation by a user to create a new electronic message thread, which may be burdensome to the user. Moreover, having a separate electronic message thread for each subject with the same group of participants may be inconvenient as it requires the participants to switch back and forth between the electronic message threads to participate in different subjects. Thus, mechanisms that allow participants of a group communication to easily differentiate multiple subjects in the same electronic message thread and messages corresponding to each subject are desired.

SUMMARY

In one disclosed embodiment, an electronic message thread management system is disclosed. The electronic message thread management system comprises a memory and at least one processor. The processor is configured to analyze an electronic message thread to differentiate among a plurality of subjects reflected in the electronic message thread, using at least a timestamp associated with each message included in the electronic message thread; designate each message in the electronic message thread according to one or more of the different subjects; and provide messages in the electronic message thread based on the designation of the messages.

In another disclosed embodiment, a computer-implemented method for managing an electronic message thread is disclosed. The computer-implemented method comprises analyzing the electronic message thread to differentiate among a plurality of subjects reflected in the electronic message thread, using at least a timestamp associated with each message included in the electronic message thread; designating each message in the electronic message thread according to one or more of the different subjects; and providing messages in the electronic message thread based on the designation of the messages.

In another disclosed embodiment, a non-transitory computer readable medium is disclosed. The non-transitory computer readable medium stores a set of instructions that is executable by at least one processor of a server to cause the server to perform a method for managing an electronic message thread. The method comprises analyzing the electronic message thread to differentiate among a plurality of subjects reflected in the electronic message thread, using at least a timestamp associated with each message included in the electronic message thread; designating each message in the electronic message thread according to one or more of the different subjects; and providing messages in the electronic message thread based on the designation of the messages.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
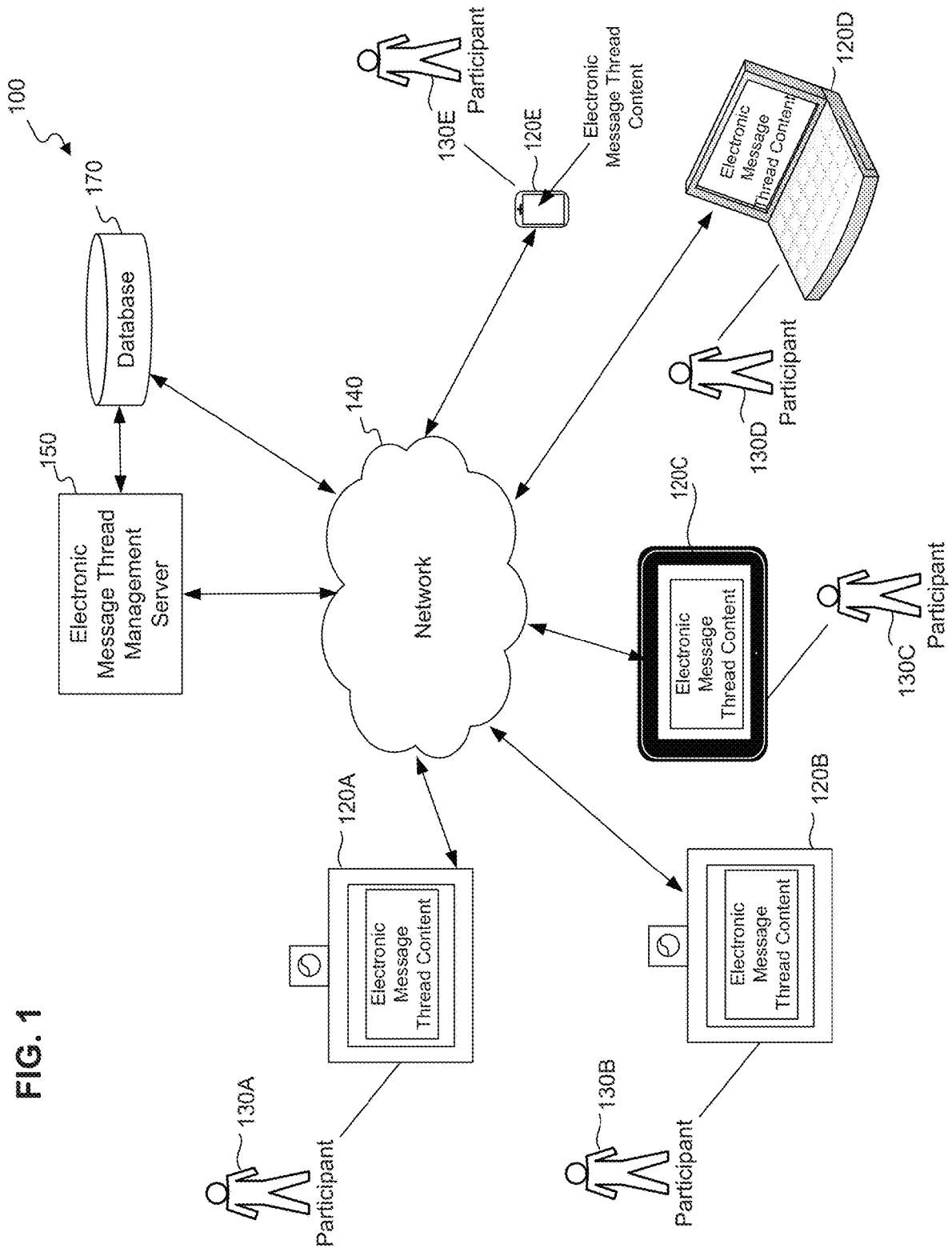
FIG. 1 is a diagram of an example of a communications system in which various implementations described herein are practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

Group communication environments, such as chat applications, social network applications, collaboration platforms, etc., provide participants with the ability to discuss multiple subjects in a single electronic message thread. A participant of a group communication may be interested in certain subjects in the electronic message thread and need to review messages corresponding to those subjects. It may be desired that messages in an electronic message thread are presented in a manner that differentiates among multiple subjects discussed in the electronic message thread. In the present disclosure, an electronic message thread refers to a communication session (e.g., an instant messaging session) that allows a group of participants to communicate with one another by exchanging messages over a network. The messages may contain text, audio, video, data, or any other multimedia content. Electronic messages are often time-stamped based on a time when the electronic message was transmitted or received.

Example embodiments of the present disclosure provide methods and systems for managing an electronic message thread. Consistent with disclosed embodiments, an electronic message thread management system analyzes an electronic message thread to differentiate among a plurality of subjects reflected in the electronic message thread using, for example, a timestamp associated with each message included in the electronic message thread. The electronic message thread management system designates each message in the electronic message thread according to one or more of the different subjects and provides messages in the electronic message thread based on the designation of the messages.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 shows an example of a communications system 100 in which various implementations as described herein are practiced. As shown in FIG. 1, communications system 100 includes a plurality of user devices 120A-120E associated with a plurality of participants 130A-130E respectively. In some embodiments, communications system 100 is, for example, a communication platform based on a chat application, a social network application that allows a group of participants (e.g., 130A-130E) to exchange messages, documents, audio or video content, gaming, and otherwise interact with one another in real-time using associated user devices (e.g., 120A-120E). In other embodiments, communications system 100 is a collaborative environment that allows a group of participants (e.g., one or more participants 130A-130E) using associated user devices (e.g., one or more user devices 120A-120E) to engage in communications, such as instant messaging (IM), chat, email, voice over IP (VoIP) phone call, audio or video conferencing, etc., as well as sharing communication content associated with the collaboration such as data files, documents, images, audio/video content, etc.

As shown in FIG. 1, communications system 100 includes one or more user devices 120A-120E (collectively as user devices 120), a network 140, an electronic message thread management server 150, and a database 170. The components and arrangements shown in FIG. 1 are not intended to limit the disclosed embodiments, as the system components used to implement the disclosed processes and features can vary.

The network 140 facilitates communications and sharing of electronic message thread content between the user devices 120 and the electronic message thread management server 150. Although shown as separate from network 140, in some embodiments, server 150 may be included within network 140. The network 140 may be any type of networks that provides communications, exchanges information, and/or facilitates the exchange of information between the electronic message thread management server 150 and user devices 120. For example, the network 140 may be the Internet, a Local Area Network, a cellular network, a public switched telephone network ("PSTN"), or other suitable connection(s) that enables communications system 100 to send and receive information between the components of communications system 100. A network may support a variety of messaging formats, and may further support a variety of services and applications for user devices 120.

The electronic message thread management server 150 may be a system associated with a communication service provider which provides messaging services to users, such as participants 130A-130E. The electronic message thread management server 150 may also be configured to provide other data or services, such as voice, messaging, real-time audio/video, to the users. The electronic message thread management server 150 may be a computer-based system including computer system components, desktop computers, workstations, tablets, hand held computing devices, memory devices, and/or internal network(s) connecting the components. The electronic message thread management server 150 may be configured to receive messaging information from user devices 120 over the network 140, process the messaging information, store the messaging information, and/or transmit messaging information to the user devices 120 over the network 140.

For example, the electronic message thread management server 150 is configured to access an electronic message thread among a group of participants 130A-130E (collectively as participants 130) through user devices 120A-120E, analyze messages included the electronic message thread to differentiate a plurality of subjects reflected in the electronic message thread, and designate a subject to each message in the electronic message thread. The user devices 120A-120E may display the messages in the electronic message thread according to the subject designated to each message. A plurality of electronic message threads are maintained and managed by the electronic message thread management server 150 simultaneously. The electronic message thread management server 150 may also be configured to maintain a list of participants 130A-130E for each electronic message thread and generate a user profile for each participant of 130A-130E. The user profile may include a likelihood of different roles the participant may act in a certain subject, such as a topic starter, questioner, responder, etc. In some implementations, the functionality of the electronic message thread management server 150 described in the present disclosure is distributed among one or more of the user devices 120A-120E. For example, a part or all of the messages in the electronic message thread may be stored in one or more of the user devices 120, and one or more of the user devices 120A-120E performs functions such as analyzing the electronic message thread to differentiate multiple subjects in the electronic message thread, and designating a subject to each of the message in the electronic message thread.

The database 170 includes one or more physical or virtual storages coupled with the electronic message thread management server 150. The database 170 utilizes one or more storage mechanisms based on any tangible and/or non-transitory storage or memory. Further, the database 170 may store the data in a variety of formats. For example, the database 170 may be an object-relational database, a non-relational database, a full-text indexed data storage, and/or other database system. The database 170 is configured to store content of an ongoing electronic message thread and/or any previously completed electronic message threads. The database 170 may also be adapted to store a plurality of subjects reflected in the electronic message thread and user profiles of the electronic message thread participants 130. The data stored in the database 170 may be transmitted to the electronic message thread management server 150 before or during an ongoing communication session. In some embodiments, the database 170 is stored in a cloud-based server (not shown) that is accessible by or separate from the electronic message thread management server 150 and/or the user devices 120 through the network 140. While the database 170 is illustrated as an external device connected to the electronic message thread management server 150, the database 170 may also reside within the electronic message thread management server 150 as an internal component of the electronic message thread management server 150.

As shown in FIG. 1, participants 130A-130E of an electronic message thread send and/or exchange messages with one another using various types of user devices 120A-120E in a communication session. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. In some embodiments, the communications system 100 may also include devices without display or video capture capabilities, such as a cellular phone, a telephone, a wearable device, or the like (not shown). User devices 120A-120E may also include one or more software applications that facilitate the user devices to engage in communications, such as IM, VoIP, video conferences, with one another in a group messaging environment where each participant may view contents of messages posted by other participants in an electronic message thread and may post messages that can be accessed by other participants in the messaging group.

Figure 2:
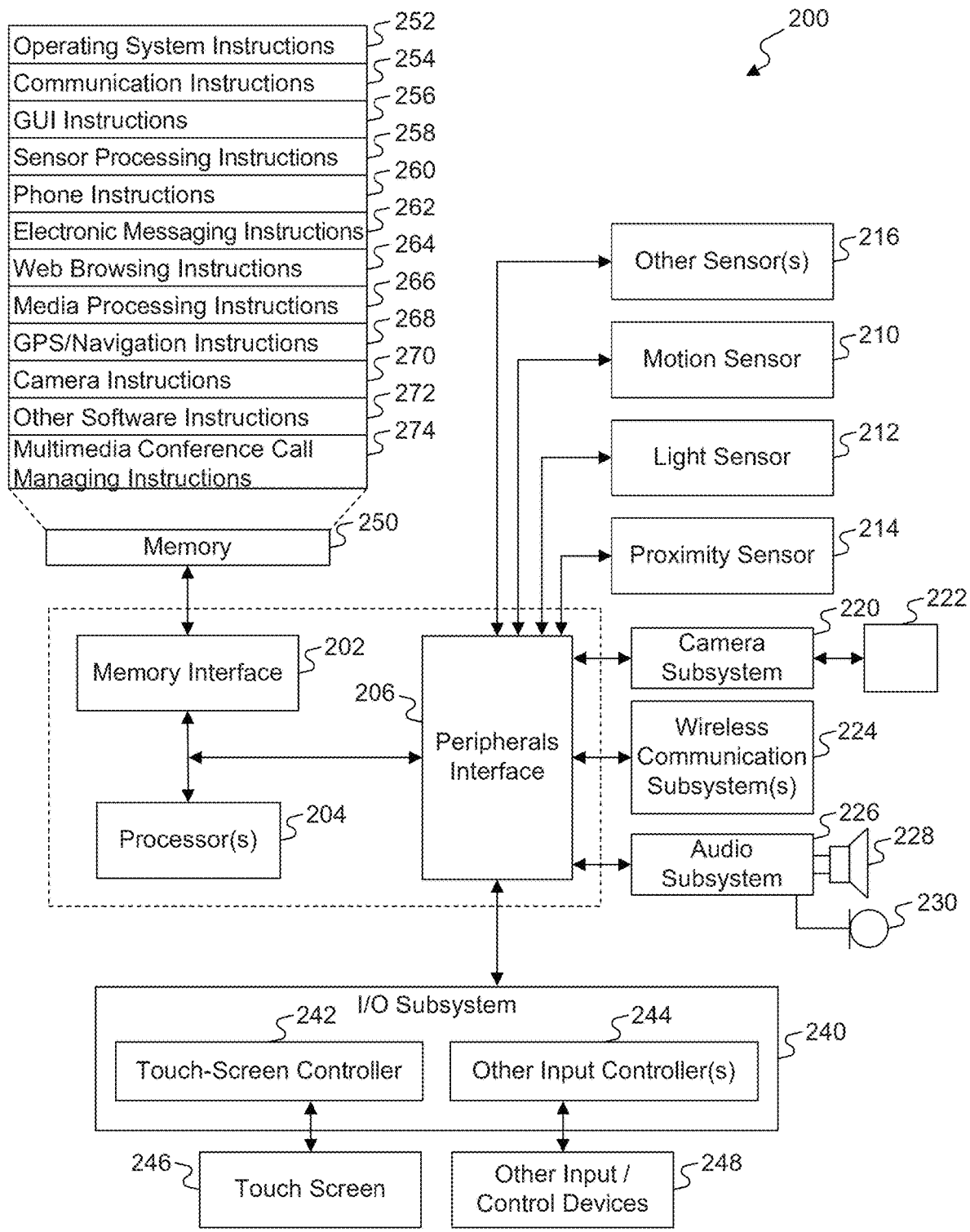
FIG. 2 is a diagram of an example user device for implementing embodiments consistent with the present disclosure.

FIG. 2 is a diagram of an example of a user device 200 for use in a communications system, such as communications system 100. The user device 200 can be used to implement computer programs, applications, methods, processes, or other software to perform embodiments described in the present disclosure, such as the user devices 120A-120E. The user device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the user device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a global positioning system (e.g., GPS receiver), a temperature sensor, a biometric sensor, or other sensing device, to facilitate related functionalities. A GPS receiver can be integrated with, or connected to, the user device 200. For example, a GPS receiver can be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes a Ethernet port, radio frequency receivers and transmitters and/or optical (e.g., infrared) receivers and transmitters. The specific design and implementation of the wireless/wired communication subsystem 224 depends on the communication network(s) over which the user device 200 is intended to operate. For example, in some embodiments, the user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

The I/O subsystem 240 includes a touch screen controller 242 and/or other input controller(s) 244. The touch screen controller 242 is coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. While a touch screen 246 is shown in FIG. 2, the I/O subsystem 240 may include a display screen (e.g., CRT or LCD) in place of the touch screen 246.

The other input controller(s) 244 is coupled to other input/control devices 248, such as one or more buttons, rocker switches, thumb-wheel, infrared port, USB port, and/or a pointer device such as a stylus. The touch screen 246 can, for example, also be used to implement virtual or soft buttons and/or a keyboard.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, iOS, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. The memory 250 may also include multimedia conference call managing instructions 274 to facilitate conference call related processes and instructions.

In some embodiments, the communication instructions 254 may include software applications to facilitate connection with the electronic message thread management server 150 that hosts a messaging communication session among a group of participants. The electronic messaging instructions 262 may include a software program that facilitates a participant associated with the user device to receive messages in an electronic message thread and subjects designated to each message from the electronic message thread management server 150. Further, the electronic messaging instructions 262 may include software applications for a participant associated with the user device to edit a subject of one or more messages in the electronic message thread and facilitate sending the subject to the electronic message thread management server 150. The graphical user interface (GUI) instructions 256 may include a software program that facilitates display of the received messages and subjects in an electronic message thread and facilitates a participant associated with the user device to provide user input, and so on. The graphical user interface instructions 256 may also include a software program that causes messages in the electronic message thread to be displayed based on subjects designated to the messages. For example, messages designated as the same subject may be displayed in the same color, and messages designated as a different subject may be displayed in a different color. As another example, for each subject in the electronic message thread, a separate window may be displayed to contain messages designated to that subject. As another example, for each subject in the electronic message thread, a separate part of the window is used to display messages designated to that subject, such as using vertical lines, horizontal lines or diagonal (45 degree) separation lines to distinguish different subjects.

Each of the above identified instructions and applications may correspond to a set of instructions for performing one or more functions described above. These instructions need not be implemented as separate software programs, procedures, or modules. The memory 250 may include additional instructions or fewer instructions. Furthermore, various functions of the user device 200 may be implemented in hardware and/or in software, including in one or more signal processing and/or application specific integrated circuits.

Figure 3:
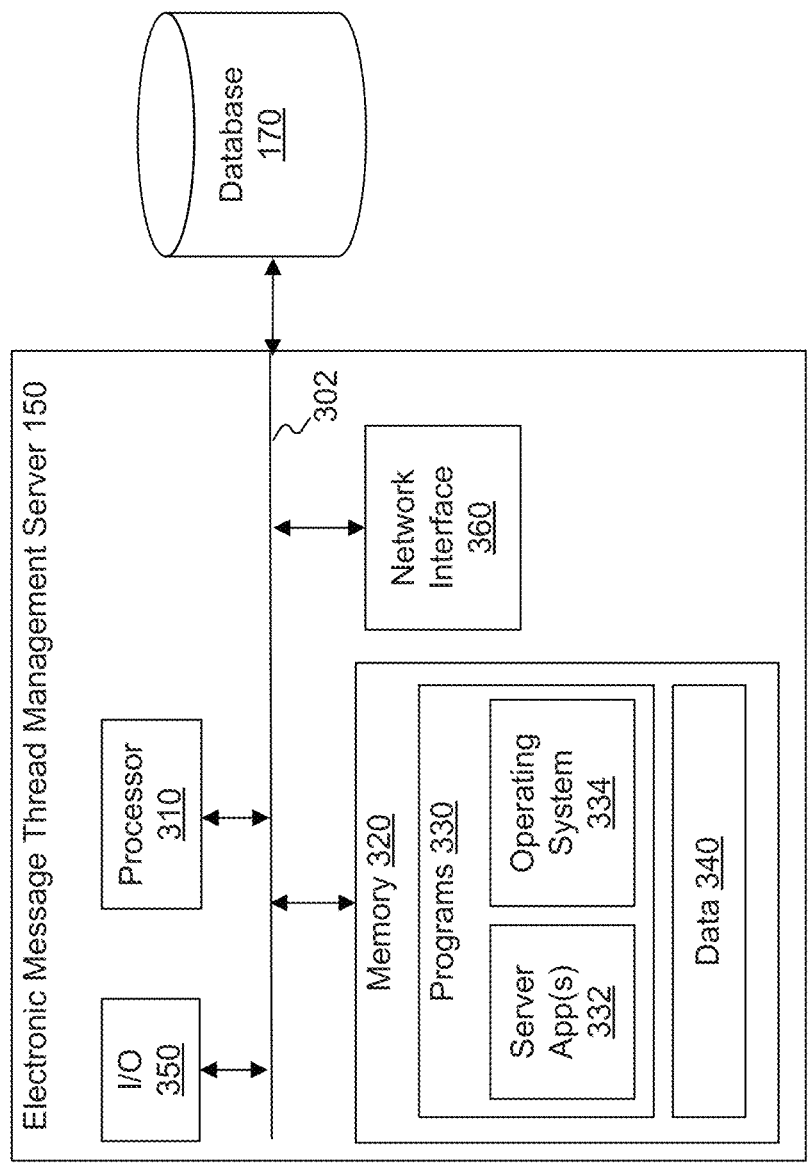
FIG. 3 is a diagram of an example electronic message thread management server, consistent with the disclosed embodiments.

FIG. 3 shows a diagram of an example electronic message thread management server 150, consistent with the disclosed embodiments. The electronic message thread management server 150 includes a bus 302 (or other communication mechanism) which interconnects subsystems and components for transferring information within the electronic message thread management server 150. As shown, the electronic message thread management server 150 may include one or more processors 310, input/output ("I/O") devices 350, network interface 360 (e.g., a modem, Ethernet card, or any other interface configured to exchange data with a network), and one or more memories 320 storing programs 330 including, for example, server app(s) 332, operating system 334, and data 340, and can communicate with an external database 170 (which, for some embodiments, may be included within the electronic message thread management server 150). The electronic message thread management server 150 may be a single server or may be configured as a distributed computer system including multiple servers, server farms, clouds, or computers that interoperate to perform one or more of the processes and functionalities associated with the disclosed embodiments.

The processor 310 may be one or more processing devices configured to perform functions of the disclosed methods, such as a microprocessor manufactured by Intel™ or manufactured by AMD™. The processor 310 may comprise a single core or multiple core processors executing parallel processes simultaneously. For example, the processor 310 may be a single core processor configured with virtual processing technologies. In certain embodiments, the processor 310 may use logical processors to simultaneously execute and control multiple processes. The processor 310 may implement virtual machine technologies, or other technologies to provide the ability to execute, control, run, manipulate, store, etc. multiple software processes, applications, programs, etc. In some embodiments, the processor 310 may include a multiple-core processor arrangement (e.g., dual, quad core, etc.) configured to provide parallel processing functionalities to allow the electronic message thread management server 150 to execute multiple processes simultaneously. It is appreciated that other types of processor arrangements could be implemented that provide for the capabilities disclosed herein.

The memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The electronic message thread management server 150 may include one or more storage devices configured to store information used by processor 310 (or other components) to perform certain functions related to the disclosed embodiments. For example, the electronic message thread management server 150 includes memory 320 that includes instructions to enable the processor 310 to execute one or more applications, such as server apps 332, operating system 334, and any other type of application or software known to be available on computer systems. Alternatively or additionally, the instructions, application programs, etc. are stored in an external database 170 (which can also be internal to the electronic message thread management server 150) or external storage communicatively coupled with the electronic message thread management server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 320 and database 170 may include one or more memory devices that store data and instructions used to perform one or more features of the disclosed embodiments. The memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the electronic message thread management server 150 may be communicatively connected to one or more remote memory devices (e.g., remote databases (not shown)) through network 140 or a different network. The remote memory devices can be configured to store information that the electronic message thread management server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 330 include one or more software modules causing processor 310 to perform one or more functions of the disclosed embodiments. Moreover, the processor 310 may execute one or more programs located remotely from one or more components of the communications system 100. For example, the electronic message thread management server 150 may access one or more remote programs that, when executed, perform functions related to disclosed embodiments.

In the presently described embodiment, server app(s) 332 causes the processor 310 to perform one or more functions of the disclosed methods. For example, the server app(s) 332 may cause the processor 310 to analyze messages in an electronic message thread to differentiate a plurality of subjects reflected in the electronic message thread, designate each message in the electronic message thread according to one or more of the different subjects, and provide messages in the electronic message thread based on the designation of the messages. In some embodiments, other components of the communications system 100 may be configured to perform one or more functions of the disclosed methods. For example, user devices 120A-120E may be configured to host an electronic message thread and analyze messages in an electronic message thread to differentiate a plurality of subjects. As another example, user devices 120A-120E may be configured to provide a user interface for a participant to review and modify one or more subjects designated to one or more messages in the electronic message thread. As another example, user devices 120A-120E may be configured to provide a user interface for a participant to add metadata such as hashtags to messages for differentiation and search of different subjects.

In some embodiments, the program(s) 330 may include the operating system 334 performing operating system functions when executed by one or more processors such as the processor 310. By way of example, the operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 334. The electronic message thread management server 150 may also include software that, when executed by a processor, provides communications with network 140 through the network interface 360 and/or a direct connection to one or more user devices 120A-120E.

In some embodiments, the data 340 includes, for example, timestamps associated with each message in an electronic message thread and/or user profiles of participants of the electronic message thread. For example, the data 340 may include instant messages sent by the participants of an electronic message thread, the likelihood of different roles each participant plays in a particular subject (e.g., the likelihood of being a subject initiator, a questioner, an answerer, or the like), and the time each message is written, sent, read, and/or received.

The electronic message thread management server 150 may also include one or more I/O devices 350 having one or more interfaces for receiving signals or input from devices and providing signals or output to one or more devices that allow data to be received and/or transmitted by the electronic message thread management server 150. For example, the electronic message thread management server 150 may include interface components for interfacing with one or more input devices, such as one or more keyboards, mouse devices, and the like, that enable the electronic message thread management server 150 to receive input from an operator or administrator (not shown).

Figure 4:
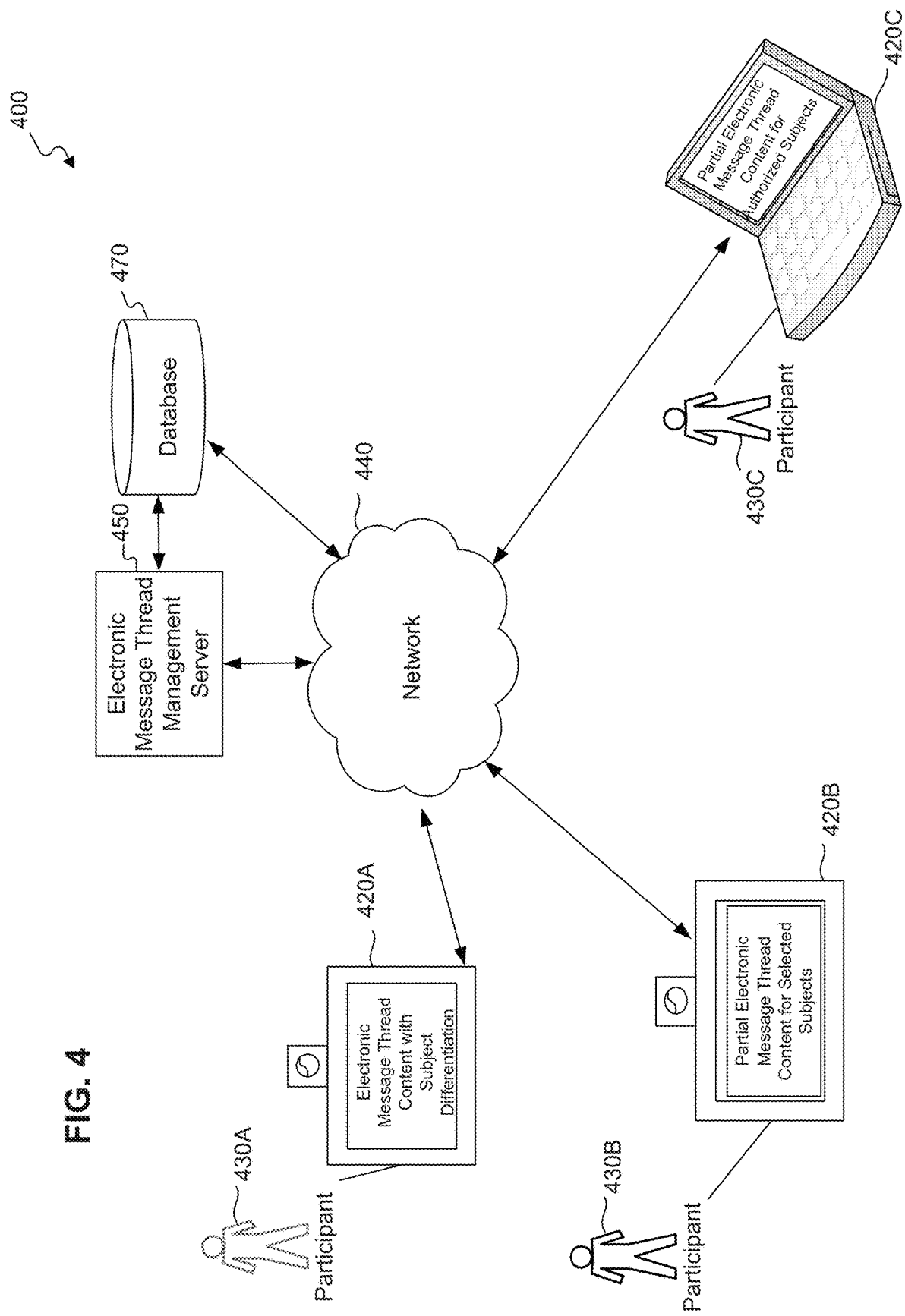
FIG. 4 is a diagram of an example communications system in which various implementations described herein are practiced.

FIG. 4 is a diagram of another example communications system 400 in which various implementations of providing messages included in an electronic message thread may be practiced. As shown in FIG. 4, similar to the communications system 100, the communications system 400 includes one or more user devices 420A-420C (collectively as user devices 420), a network 440, an electronic message thread management server 450, and a database 470. The components and arrangements shown in FIG. 4 are not intended to limit the disclosed embodiments, as the system components used to implement the disclosed processes and features can vary.

In this example, a messaging session is established among participants 430A, 430B, and 430C, in which an electronic message thread including a series of messages has been exchanged between participants 430A-430C for a certain period of time. The messages included in the electronic message thread involve a number of different subjects. Participant 430A is interested in viewing each discussed subject and the entire electronic message thread, while participants 430B and 430C would like to view only a subset of the different subjects and messages corresponding to these subjects.

The electronic message thread management server 450 may analyze messages and associated information subjects reflected in the electronic message thread to differentiate subjects of each message using a variety of techniques. For example, the electronic message thread management server 450 may detect the timestamp associated with each message indicating the time the message is initially written, the time the message is sent, the time the message is read, and/or the time the message is received, etc. In some embodiments, the electronic message thread management server 450 may determine that the messages belong to a different subject if the time space between the messages is greater than a predetermined threshold. The electronic message thread management server 450 may also analyze content of messages based on key words, hashtags, or using other techniques, such as machine learning algorithms, to differentiate a plurality of different subjects. For example, a problem associated with determining an adequate subject for messages in an electronic message thread is the lack of words describing the subject. As the electronic message thread increases, the amount of message data (such as message text or attachments to the message) contained in the electronic message thread also increase. Accordingly, determination of a suitable subject for the messages in an electronic message thread can be enhanced using keywords derived from the message data. The enhanced subject may replace the former subject to the messages in the electronic message thread. In other examples, if new message arrives from the participant who was assigned the role of a watcher in the electronic message thread, it is likely that a new subject is started. The electronic message thread management server 450 may assign a weight to the result obtained by using each type of technique and combine results of using different techniques to differentiate subjects discussed in the electronic message thread. For example, timestamps associated with messages may be checked first, and if the differences between the timestamps are greater than a predetermined threshold, the electronic message thread management server 450 may check content, keywords and roles associated with the messages for differentiation of subjects. The electronic message thread management server 450 may increase the threshold if several messages with timestamp more than threshold are assigned to the same subject or vice-a-versa.

After differentiating the subjects reflected in the electronic message thread, the electronic message thread management server 450 designates each message in the electronic message thread based on the corresponding subject. For example, messages corresponding to the same subject may have the same designation. The electronic message thread management server 450 may store the designation corresponding to each message in a local memory, namely the database 470, and/or a cloud-based remote server, and send the messages and the corresponding designations to the user devices 420A-420C associated with participants 430A-430C for display. The user devices 420A-420C then provide user interfaces that allow the participants 430A-430C to view and/or access a part or all of received messages based on the designations.

Referring to FIG. 4, participant 430A desires to view all subjects involved in the electronic message thread, and the entire electronic message thread is displayed on the user device 420A associated with participant 430A with subject differentiation. For example, messages corresponding to different subjects may be displayed in different colors, in different windows, or in different areas of one chat window separated by lines. In some embodiments, a brief description of the subject may be displayed along with the messages corresponding to the subject. In some embodiments, one or more subjects of the electronic message thread may further include a plurality of different sub-topics, and these subjects and sub-topics may be displayed in different colors, in different windows, or in different areas of one chat window separated by lines.

Participant 430B, on the other hand, desires to view messages in the electronic message thread that correspond to one or more selected subjects, instead of all subjects involved in the electronic message thread. For example, the user device 420B may provide a user interface that allows participant 430B to enter a user input selecting a subset of subjects to review. Thus, the messages corresponding to unselected subjects are hidden from the display of the user device 420B. The user device 420B may also provide a user interface that allows participant 430B to modify the selection of subjects for reviewing or return to the mode of displaying the entire electronic message thread that includes every subject. In some implementations, the user device 420B may also provide a user interface that displays selected or active subject in a larger part of the window and displays inactive subjects in smaller part of the window. When a message that corresponds to an inactive subject is received, the part of the window corresponding to the inactive subject may become larger, and in the meantime, the part of the window corresponding to the active subject may become smaller.

In some embodiments, the electronic message thread management server 450 may determine that messages corresponding to certain subjects are not authorized in the electronic message thread and may prevent these messages from being displayed in the user devices associated with the participants. For example, another participant, such as participant 430A, may begin posting messages showing passwords of accessing a confidential database, and the electronic message thread management server 450 may determine that these messages relate to an unauthorized subject. Referring to FIG. 4, the electronic message thread management server 450 may refrain from sending messages corresponding to unauthorized subjects to the user device 420C associated with participant 430C, and messages corresponding to these subjects in the electronic message thread are not accessible to participant 430C. As shown in FIG. 4, the user device 420C displays partial electronic message thread content that contain messages corresponding to authorized subjects for participant 430C. In some embodiments, the thread management server 450 may redact messages corresponding to the unauthorized subjects before sending them to the user device 420C, such that content of these messages is unrecognizable when displayed on the user device 420C.

In some embodiments, the electronic message thread management server 450 determines that messages corresponding to certain subjects are remote from the main subject of the electronic message thread and may require a new electronic message thread to be established for these messages. For example, a participant, such as participant 430A, may begin posting messages that have little relevance to the main subject of the electronic message thread, and the electronic message thread management server 450 may determine that these messages significantly deviate from the main subject and require participant 430A to create a new electronic message thread for these messages. The electronic message thread management server 450 may refrain from sending messages corresponding to the irrelevant subjects to the user devices 420B and 420C associated with participants 430B and 430C.

In some embodiments, the electronic message thread management server 450 sets access permission for one or more subjects reflected in the electronic message thread. For example, when a participant posts a new message corresponding to a new subject, the participant may restrict the message to be viewable to a subset of participants in the electronic message thread, and may send the access permission setting for the new message to the electronic message thread management server 450. Correspondingly, the electronic message thread management server 450 may set the access permission for messages corresponding to the new subject to be viewable only by the selected participants. As another example, the electronic message thread management server 450 may implement one or more rules to exclude subjects relating to confidential information to be provided unless the participants satisfy a certain condition. For instance, the rules may include security policies such as only providing messages including confidential information to participants that are employees with a high security level inside an organization.

Figure 5:
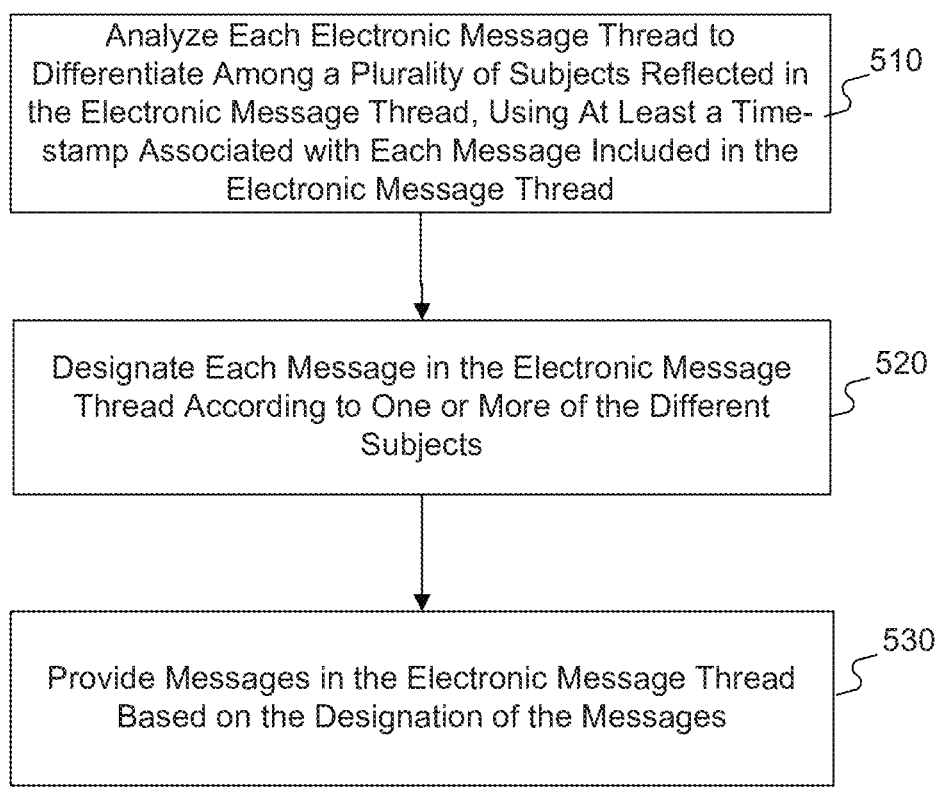
FIG. 5 is a flowchart of an example process for managing electronic message threads, in accordance with embodiments of the present disclosure.

FIG. 5 is a flowchart of an example process 500 for managing electronic message threads, in accordance with embodiments of the present disclosure. The steps associated with this example process may be performed by, for example, a processor of the electronic message thread management server 150 of FIG. 1.

In step 510, the electronic message thread management server analyzes each electronic message thread to differentiate among a plurality of subjects reflected in the electronic message thread, using at least a timestamp associated with each message included in the electronic message thread. The timestamp associated with a message may include at least one of: a start time of the message being composed or completed, a time of the message being sent, a time of the message being received, and a time of the message being read.

In some embodiments, the electronic message thread management server determines whether the messages in the electronic message thread belong to the same subject based on a time period between the messages. For example, the electronic message thread management server may determine that the messages belong to different subjects if the time period between the messages is greater than a predetermined threshold. In some implementations, the electronic message thread management server 450 may determine the time period between a first message sent earlier by a first participant and a second message sent later by a second participant as the time period between the time a first message is read by the second participant and the time the second participant starts to write the second message. The reason is that there is a high likelihood that the second message relates to the same subject as the first message when the second participant starts typing the second message right after reading the first message from the first participant.

In some embodiments, the electronic message thread management server uses additional techniques to differentiate subjects in the electronic message thread in combination with the timestamps. For example, the electronic message thread management server may identify keywords contained in the messages and differentiate subjects in the messages based on the identified keywords. If one or more identical keywords are contained in some of the messages, the electronic message thread management server may determine that it is likely that these messages relate to the same subject. Keyword detection methods known by persons skilled in the art may be used to differentiate subjects in the electronic message thread without departing the scope of the present disclosure.

In some embodiments, the electronic message thread management server may differentiate subjects in the electronic message thread based on profiles of the message senders. For example, the electronic message thread management server may generate a user profile for participants of an electronic message thread. The user profile may indicate the person's role in a number of different subjects, such as a subject initiator, a questioner, a responder, etc. For instance, the user profile of a participant may indicate that the participant is likely a questioner for information technology subjects, a subject initiator for professional recruiting subjects, and a responder for employee benefits subjects. In some implementations, the user profile may indicate the likelihood of different roles the participant may act in a number of different subjects. For instance, the user profile of a participant may indicate that the likelihood of a participant being a subject initiator, a questioner, and a responder for information technology subjects is 0.5, 0.1, and 0.8, respectively. The user profile may also indicate that the likelihood of the participant being a subject initiator, a questioner, and a responder for human resource subjects is 0.2, 0.3, and 0.01, respectively. The likelihoods of the participant's roles may be determined based on the participant's expertise with respect to certain subject matter. The likelihoods of the participant's roles and/or the participant's expertise with respect to one or more subject matters may be saved in the user profile of the participant. Based on the estimated role of a message sender in the electronic message thread, the electronic message thread management server may determine that the subject of the message posted by the message sender.

In some embodiments, the electronic message thread management server may differentiate subjects in the electronic message thread based on direct user inputs. For example, when typing a message, the participant may also enter or select a subject associated with the message (e.g., using hashtags, @mentions, etc.) in a user device associated with the participant. The electronic message thread management server may detect the subject of the message based on the user input and differentiate with other subjects discussed in the electronic message thread. In some embodiments, the electronic message thread management server may differentiate subjects in the electronic message thread based on an assigned task, such as an electronic message thread initiated from a task tracking software. As another example, the participant may enter a user input to categorize messages included in the electronic message thread, for example, by placing messages belonging to the same subject to the same category, and the electronic message thread management server may then differentiate subjects reflected in the electronic message thread based on the user input. In some implementations, the electronic message thread management server may continually adjust the subject differentiation algorithms based on received user inputs.

In some embodiments, the electronic message thread management server may differentiate subjects in the electronic message thread using machine learning techniques. For example, during electronic message thread amount of message data increases and it becomes easier to determine keywords to improve determining a suitable subject to the electronic message thread and thereby assigning the enhanced subject to messages in the electronic message thread and/or any new messages. As another example, if a new message arrives from the participant who was assigned as a role of a watcher in the electronic message thread it is likely that new subject is started.

In some embodiments, when multiple techniques are used to differentiate subjects in the electronic message thread, the electronic message thread management server may combine results generated by the various techniques with predetermined weights. For example, a predetermined weight may be assigned to each subject differentiation technique. The predetermined weight for each subject differentiation technique may vary depending on the application scenarios. For example, the above-discussed timestamp method may be assigned a dominate weight in one scenario, while the above-discussed keyword method may be assigned a dominate weight in another scenario. In some embodiments, timestamps associated with the messages may be checked first, and if the differences between the timestamps are greater than a predetermined threshold, the electronic message thread management server may check content, keywords and roles associated with the messages for differentiation of subjects. The electronic message thread management server may increase the threshold if several messages with timestamp more than threshold are assigned to the same subject or vice-a-versa.

In step 520, the electronic message thread management server designates each message in the electronic message thread according to one or more of the different subjects. For example, the electronic message thread management server may designate a subject among the plurality of subjects to each message in the electronic message thread. As another example, the electronic message thread management server may use indicators to designate messages in the electronic message thread. The same indicator, such as a number, a letter, a character, etc., may be used to designate messages belong to the same subject, and different indicators may be used to designate messages belong to different subjects. The present disclosure does not intend to limit the manner of designation, so long as the designation effectively conveys the differentiation of subjects reflected in the messages.

In step 530, the electronic message thread management server provides messages in the electronic message thread based on the designation of the messages. For example, the electronic message thread management server may send messages with different designations to user devices associated with the electronic message thread participants in different message headers, so as to indicate the subject differentiation among the series of messages. As another example, the electronic message thread management server may include the designations in the metadata associated with the messages to indicate the differentiation of subjects in the messages. As another example, the electronic message thread management server may send a brief description of the subjects to the user devices associated with the electronic message thread participants, along with the messages and the designation of subjects for each message. In some implementations, the electronic message thread management server may provide a summary of message contents corresponding to each subject to the user devices.

In some embodiments, the electronic message thread management server may determine that messages corresponding to certain subjects are unauthorized and refrain from sending these messages to the user devices associated with the electronic message thread participants. The electronic message thread management server may also send redacted contents to the user devices for messages corresponding to unauthorized subjects. In some embodiments, a participant of the electronic message thread may request not to receive messages corresponding to certain subjects, and after receiving the request from the participant, the electronic message thread management server may refrain from sending these messages to the user device associated with the participant.

In some embodiments, the electronic message thread management server may perform the process 500 autonomously without requiring any user input. For example, the electronic message thread management server may execute algorithms or use machine learning techniques to differentiate among the subjects reflected in each electronic message thread, and no user input or user-implemented rule is needed for the electronic message thread management server to perform this function.

In some embodiments, some or all of the steps in the process 500 may be performed by a user device, such as the user devices 120A-120E of FIG. 1. For example, the user device may be configured to analyze electronic message thread to differentiate among a plurality of subjects reflected in the electronic message thread, designate each message in the electronic message thread according to the different subjects, and/or provide messages in the electronic message thread based on the designation of the messages.

Figure 6:
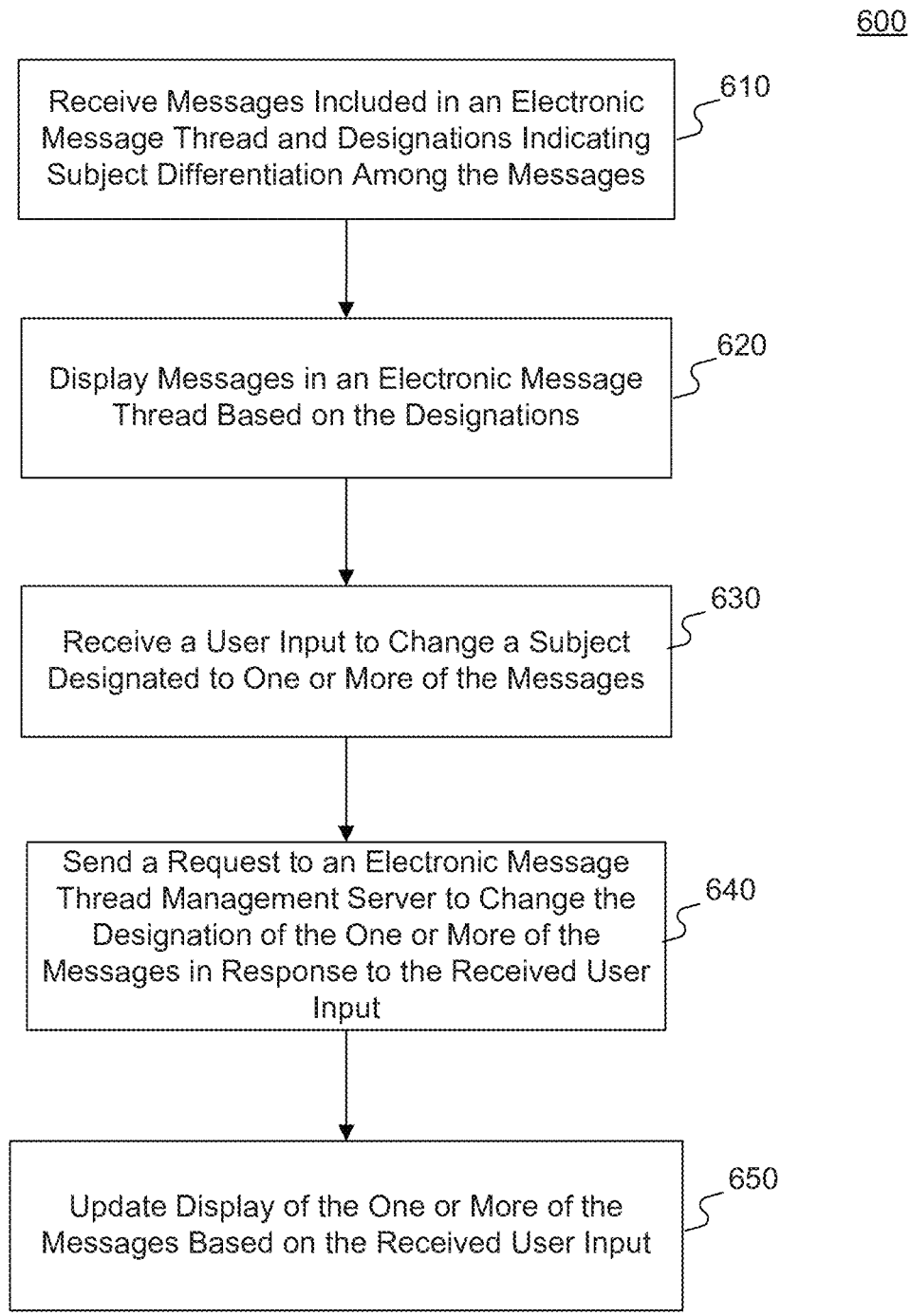
FIG. 6 is a flowchart of an example process for accessing, reviewing, or displaying messages in an electronic message thread, in accordance with embodiments of the present disclosure.

FIG. 6 is a flowchart of an example process 600 for accessing, reviewing, or displaying messages in an electronic message thread, in accordance with embodiments of the present disclosure. The steps associated with this example process may be performed by a user device associated with a participant of the electronic message thread, such as the user devices 120A-120E of FIG. 1.

In step 610, the user device receives, from an electronic message thread management server, messages included in an electronic message thread and designations indicating subject differentiation among the messages. For example, the designations may indicate that a plurality of subjects is discussed in the electronic message thread and, for each subject, indicate a group of messages corresponding to that subject. In some embodiments, the user device may further receive a brief description of the plurality of subjects from the electronic message thread management server. In some implementations, messages in the electronic message thread and designations indicating subject differentiation among the messages may be sent separately, and the user device may receive messages included in an electronic message thread from one server and receive designations indicating subject differentiation among the messages from another server.

In step 620, the user device displays messages in an electronic message thread based on the designations. For example, the user device may display messages belonging to different subjects in different colors, such that the participant using the user device may easily differentiate messages for different subjects and locate messages corresponding to a particular subject. In some implementations, messages belonging to the same subject may be displayed in similar colors, and the alikeness of the colors used to display the messages decreases when the subjects corresponding to the messages are more distinct. As another example, the user device may display messages belonging to different subjects in a tree structure. Messages corresponding to different subjects may be placed in different nodes of the tree, and messages corresponding to different sub-topics within the same subject may be placed in different child nodes under the same parent node representing the common subject. As another example, the user device may display messages belonging to different subjects in separate regions inside the electronic message thread window. In some embodiments, the user device receives an input from the participant to hide messages corresponding to certain subjects in the display and cause those messages to be hidden in the display. In other embodiments, the user device provides an interface to allow the participant to switch the display of messages between a regular chat mode in which messages are displayed with no subject differentiation and a subject mode in which messages are displayed with the subject differentiation. In some embodiments, the user device may provide a user interface that includes a drop-down menu to allow the participant to select certain subject or to select certain message corresponding to a subject for viewing.

In step 630, the user device receives a user input to change a subject designated to one or more of the messages. For example, the user input may include a dragging action on one of the messages which moves the one message from a group of messages corresponding to one subject to another group of messages corresponding to another subject. As another example, the user input may include a brief description of the subject corresponding to one or more of the messages that is entered by the participant associated with the user device. As another example, the user input may include a hashtag, "@mentions," or other predetermined phrases to identify a specific subject. The present disclosure does not intend to limit the types of user input to modify the subject designated to one or more of the messages.

In step 640, the user device sends a request to the electronic message thread management server to change the designation corresponding to the one or more of the messages in response to received user input. For example, the request may indicate the modified subject corresponding to the one or more of the messages that is entered by the participant. The electronic message thread management server may subsequently update the designation corresponding to the one or more of the messages after receiving the request from the user device. In some implementations, the electronic message thread management server may further adjust the algorithm to differentiate a plurality of subjects based on information obtained from the request. The electronic message thread management server may also update the designations corresponding to other messages in the electronic message thread based on the adjusted algorithm and send the updated designations to the user device.

In step 650, the user device updates display of the one or more of the messages based on the received user input. For example, the user device may move the one or more of the messages from a group of messages corresponding to one subject to another group of messages corresponding to another subject. The user device may change the color in which the one or more of the messages are displayed to reflect the changed subject by the user input corresponding to these messages. In some implementations, the user device may receive updated designations corresponding to other messages in the electronic message thread from the electronic message thread management server after sending the request to the electronic message thread management server, and the user device may update display of the other messages based on the updated designation.

Figure 7A:
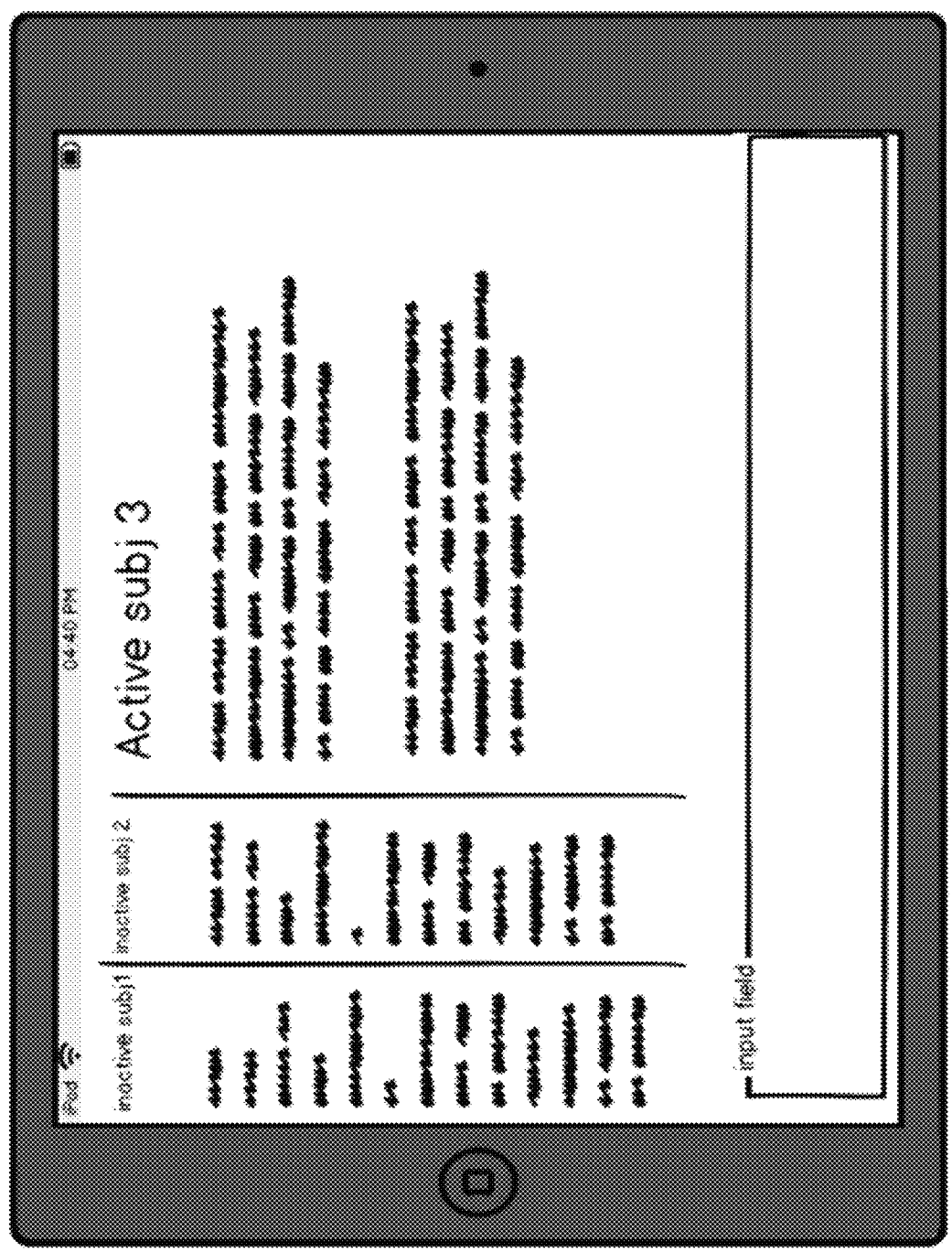
FIGS. 7A-7C each illustrate example user interfaces for providing messages in an electronic message thread, in accordance with embodiments of the present disclosure.
Figure 7B:
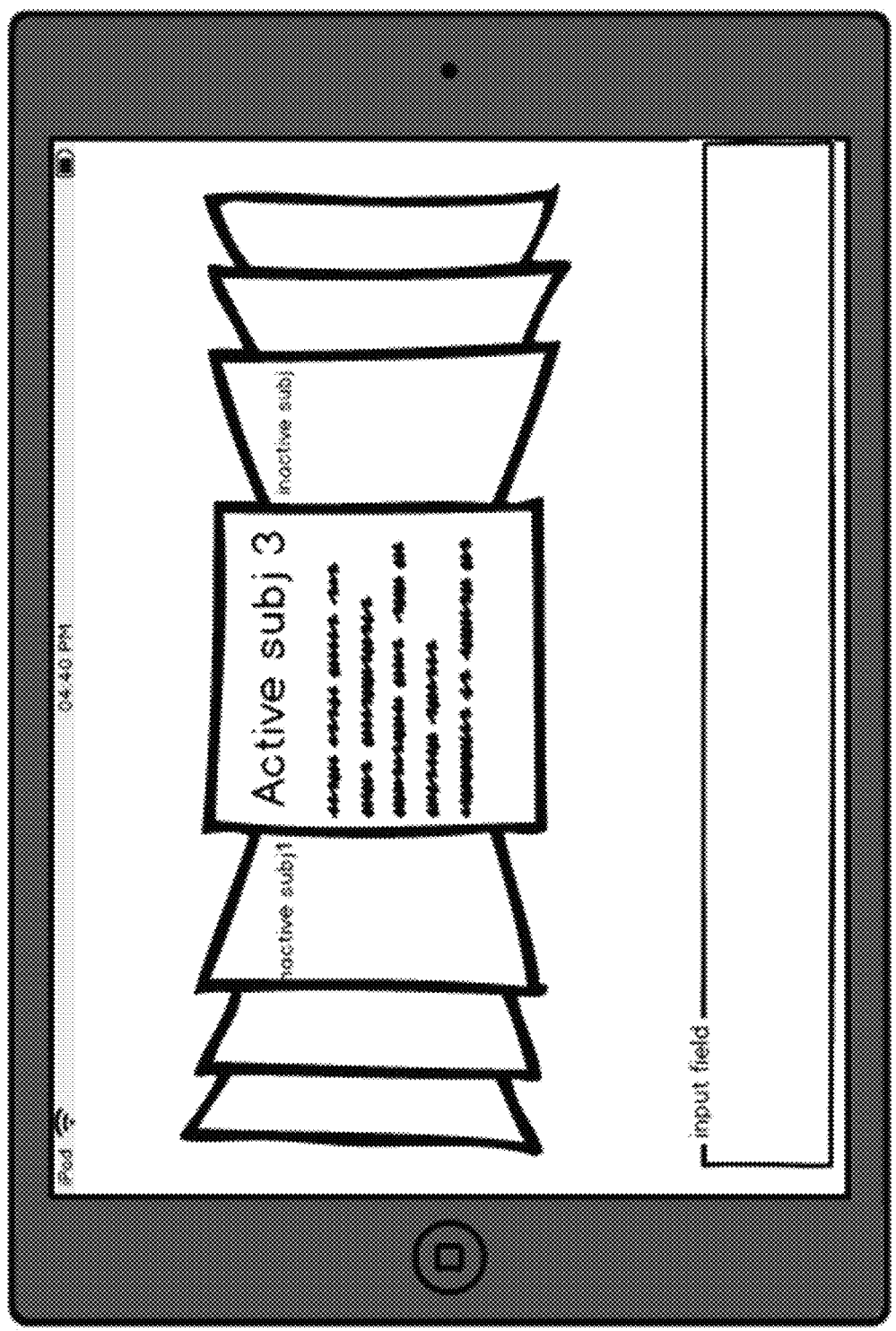
Figure 7C:
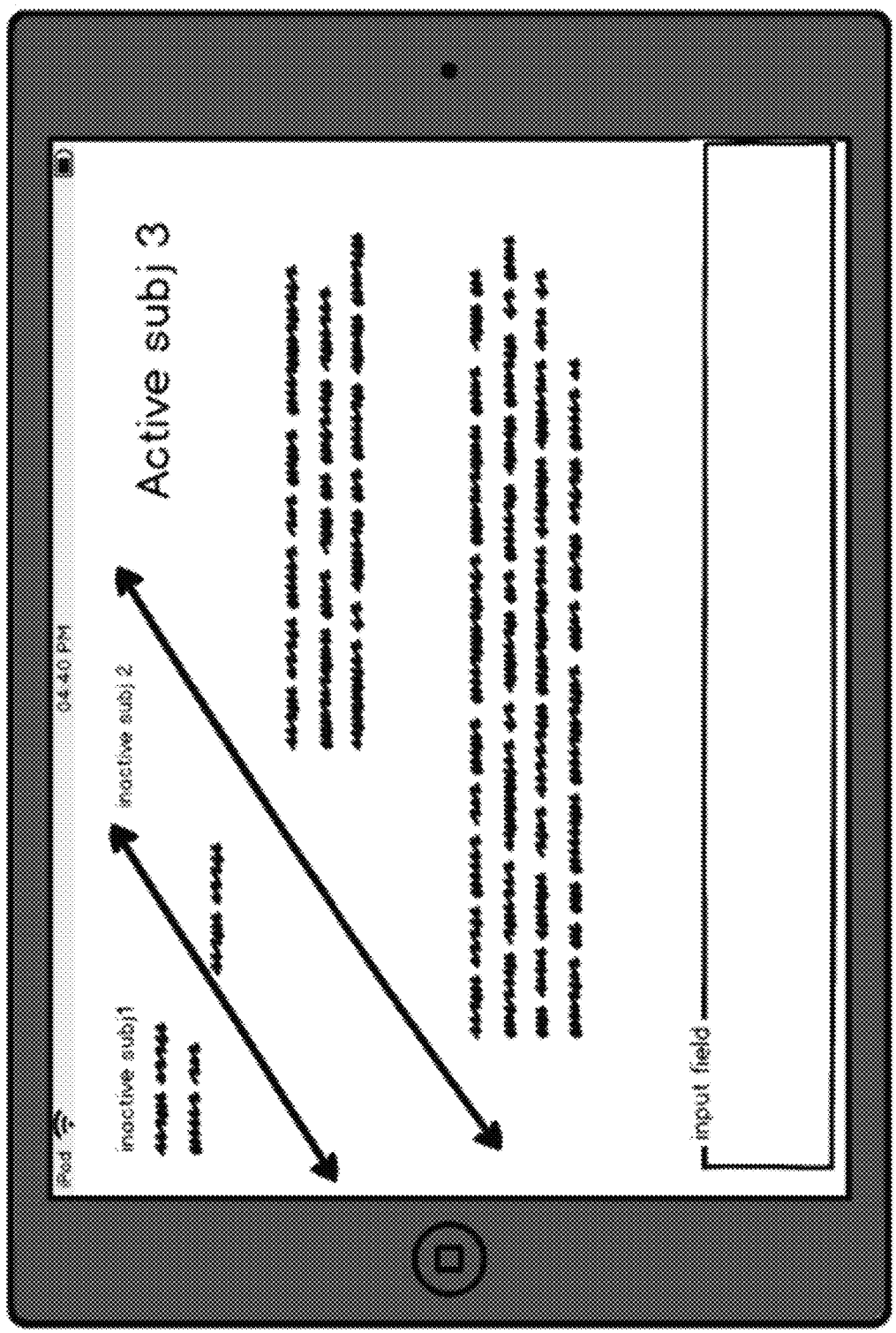

FIGS. 7A-7C illustrate example user interfaces 700A-700C for providing messages in an electronic message thread, in accordance with embodiments of the present disclosure. As shown in FIG. 7A, the messages corresponding to subjects 1-3 are displayed in different parts of the window, in which the selected subject 3 occupies a bigger area in the window. As depicted in FIG. 7B, the messages corresponding to the selected subject 3 are displayed in the center of the chat window, while the inactive subjects are displayed in the off-center part of the window. As shown in FIG. 7C, the messages corresponding to the different subjects are separated by diagonal (45 degree) separation lines, and the messages corresponding to the selected subject 3 occupy a relative bigger area of the window. FIGS. 7A-7C serve as examples of presenting the messages based on their designated subjects, and the present disclosure does not intend to limit the way the messages are displayed based on differentiation of the subjects.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. An electronic message thread management system comprising:
   a memory; and
   at least one processor configured to:
   for an electronic message from an electronic message thread, determine a role of a message sender, wherein the role of the message sender is one of a subject initiator, a questioner, or a responder;
   determine a first weight corresponding to a timestamp associated with the electronic message;
   determine a second weight corresponding to the role of the message sender of the electronic message;
   determine a subject for the message based on the first weight, the second weight and a profile of the message sender from among stored profiles indicating likelihoods of the role of the message sender for a plurality of subjects;
   designate the message in the electronic message thread according to the determined subject; and
   provide the message in the electronic message thread based on the designation of the message.

2. The electronic message thread management system of claim 1, wherein the at least one processor is further configured to:
   identify a time difference between two messages in the electronic message thread; and
   determine that the two messages in the electronic message thread are associated with a same subject based on the time difference being less than a predetermined threshold.

3. The electronic message thread management system of claim 1, wherein the at least one processor is further configured to:
   identify one or more keywords included in the message in the electronic message thread; and
   determine the subject based on the keywords and the timestamp associated with the message.

4. The electronic message thread management system of claim 3, wherein the at least one processor is further configured to:
   determine a weight corresponding to the keywords; and
   determine the subject based on the keywords and the weight corresponding to the keywords.

5. The electronic message thread management system of claim 1, wherein the timestamp associated with the message includes at least one of a start time of the message being written, a time of the message being sent, a time of the message being received, or a time of the message being read.

6. The electronic message thread management system of claim 1, wherein the at least one processor is further configured to:
   generate one or more user profiles for one or more participants in the electronic message thread, wherein the user profiles include a likelihood of different roles for a corresponding participant in one or more of the plurality of subjects.

7. The electronic message thread management system of claim 1, wherein the at least one processor is further configured to:

receive, from a user device, a request to change a subject designated to one of messages in the electronic message thread; and modify the designation of the one of messages based on the request.

8. The electronic message thread management system of claim 1, wherein the at least one processor is further configured to:

cause messages in the electronic message thread to be displayed in different colors based on the designation of the messages.

9. The electronic message thread management system of claim 8, wherein a first message associated with a first subject is displayed in a first color, and a second message associated with a second subject is displayed in a second color.

10. The electronic message thread management system of claim 1, wherein the at least one processor is further configured to:

cause the message associated with the subject to be hidden from one or more participants in the electronic message thread.

11. A computer-implemented method for managing an electronic message thread, comprising:

for an electronic message from an electronic message thread, determining a role of a message sender, wherein the role of the message sender is one of a subject initiator, a questioner, or a responder;

determining a first weight corresponding to a timestamp associated with the electronic message;

determining a second weight corresponding to the role of the message sender of the electronic message;

determining a subject for the message based on the first weight, the second weight and a profile of the message sender from among stored profiles indicating likelihoods of the role of the message sender for a plurality of subjects;

designating the message in the electronic message thread according to the determined subject; and providing the message in the electronic message thread based on the designation of the message.

12. The computer-implemented method of claim 11, further comprising:

identifying a time difference between two messages in the electronic message thread; and determining that the two messages in the electronic message thread are associated with a same subject based on the time difference being less than a predetermined threshold.

13. The computer-implemented method of claim 11, further comprising:

identifying one or more keywords included in the message in the electronic message thread; and determining the subject based on the keywords associated with the message.

14. The computer-implemented method of claim 11, wherein the timestamp associated with the message includes at least one of a start time of the message being written, a time of the message being sent, a time of the message being received, or a time of the message being read.

15. The computer-implemented method of claim 11, further comprising:

generating one or more user profiles for one or more participants in the electronic message thread, wherein the user profiles include a likelihood of different roles for a corresponding participant in one or more of the plurality subjects.

16. The computer-implemented method of claim 11, further comprising:

receiving, from a user device, a request to change a subject designated to one of messages in the electronic message thread; and modifying the designation of the one of messages based on the request.

17. The computer-implemented method of claim 11, further comprising:

displaying messages in the electronic message thread in different colors based on the designation of the messages.

18. The computer-implemented method of claim 17, wherein a first message associated with a first subject is displayed in a first color, and a second message associated with a second subject is displayed in a second color.

19. The computer-implemented method of claim 11, further comprising:

causing the message associated with the subject to be hidden from one or more participants in the electronic message thread.

20. A non-transitory computer readable medium that stores a set of instructions that is executable by at least one processor of a server to cause the server to perform a method for managing an electronic message thread, the method comprising:

for an electronic message from the electronic message thread, determining a role of a message sender, wherein the role of the message sender is one of a subject initiator, a questioner, or a responder;

determining a first weight corresponding to a timestamp associated with the electronic message;

determining a second weight corresponding to the role of the message sender of the electronic message;

determining a subject for the message based on the first weight, the second weight and a profile of the message sender from among stored profiles indicating likelihoods of the role of the message sender for a plurality of subjects;

designating the message in the electronic message thread according to the determined subject; and providing the message in the electronic message thread based on the designation of the message.

* * * * *